United States Patent [19]

Jacobs

[11] 4,063,685
[45] Dec. 20, 1977

[54] THRUST VECTOR CONTROL BY CIRCULATION CONTROL OVER AERODYNAMIC SURFACES IN A SUPERSONIC NOZZLE

[75] Inventor: Paul L. Jacobs, Huntsville, Ala.

[73] Assignee: The United States of America as represented by the Secretary of the Army, Washington, D.C.

[21] Appl. No.: 710,064

[22] Filed: July 30, 1976

[51] Int. Cl.² ............................................. B64C 15/10
[52] U.S. Cl. .................................. 239/265.17; 60/231; 239/265.23; 244/207; 244/52
[58] Field of Search ................. 239/265.17, 265.23; 244/42 CC, 42 CD, 52, 207; 60/230, 231, 264; 137/803, 834, 838, 839

[56] References Cited

U.S. PATENT DOCUMENTS

| | | | |
|---|---|---|---|
| 2,943,821 | 7/1960 | Wetherbee, Jr. | 244/52 |
| 3,221,498 | 12/1965 | Bankston | 239/265.23 X |
| 3,229,460 | 1/1966 | Jones | 239/265.23 |
| 3,325,103 | 6/1967 | Abbott | 239/265.23 X |
| 3,350,886 | 11/1967 | Feraud et al. | 239/265.23 X |
| 3,435,837 | 4/1969 | Sher | 137/834 X |

Primary Examiner—Evon C. Blunk
Assistant Examiner—Andres Kashnikow
Attorney, Agent, or Firm—Nathan Edelberg; Robert P. Gibson; Harold W. Hilton

[57] ABSTRACT

Aerodynamic surfaces are fixedly mounted in the diverging section of a rocket nozzle and a fluid is injected through the fixed jet vane to flow about the vane. Fluid flow is controlled to make it appear that from upstream the jet vane is at an angle of attack. This deflects the main flow and produces side force. A minimum of injection flow enables high side forces to be obtained for missile control.

3 Claims, 8 Drawing Figures

THRUST VECTOR CONTROL BY CIRCULATION CONTROL OVER AERODYNAMIC SURFACES IN A SUPERSONIC NOZZLE

BACKGROUND OF THE INVENTION

Thrust vector control systems on missiles utilize either movable jet vanes in the rocket nozzle or direct injection of fluid along the nozzle walls to deflect the main stream and produce a side force for control. Movable jet vanes require actuation systems and shaft seals which involve many moving parts. Vane deflections are limited by separation considerations to $\sim \pm 10\text{-}15°$. Direct injection methods can use fluidic components and reduce moving parts but require substantial fluid flow for operation.

By utilizing fixed aerodynamic surfaces and controlling the flow about them by injecting fluid through the fixed vane, asymmetric objects can be presented to the flow field using a minimum of injection flow and enabling high side forces to be obtained for missile control. The injected flow essentially makes it appear that the jet vane is at an angle of attack, by controlling the circulation about it in a way similar to that which would develop if the vane was physically moved. This would simplify missile control system hardware and enable less control power to be used. It would also allow for use of valving without moving parts - fluidic and flueric control elements. This would result in high reliability, ruggedness and long term storage capability for the control system.

SUMMARY OF THE INVENTION

To provide thrust vector control for a rocket, a plurality of jet vanes are fixedly mounted in the diverging section of the nozzle. Each jet vane is provided with an inlet into which the injectant fluid is directed. A chamber communicating with the inlet and a pair of outlets in communication with the chamber, is provided in the vane. A control port is provided on opposite sides of the chamber in communication therewith and supplies a source of control fluid. The outlets communicate with holes or slots in the vane for injection into the main stream.

BRIEF DESCRIPTION OF THE DRAWING

FIG. 2a is an elevational plane view of the jet vane having a fluid amplifier integral therewith.

FIG. 2b is an end view of the jet vane illustrated in FIG. 2a.

FIG. 2c is a sectional view along line 2c—2c of FIG. 2a showing the jet vane attached to the nozzle wall.

FIG. 3a is another embodiment of the present invention wherein the fluid amplifier is not integral with the jet vane.

FIG. 3b is an end view of the jet vane of FIG. 2b.

FIG. 3c is a sectional view along line 3c—3c of FIG. 3a.

DESCRIPTION OF THE PREFERRED EMBODIMENTS

Figure 1:
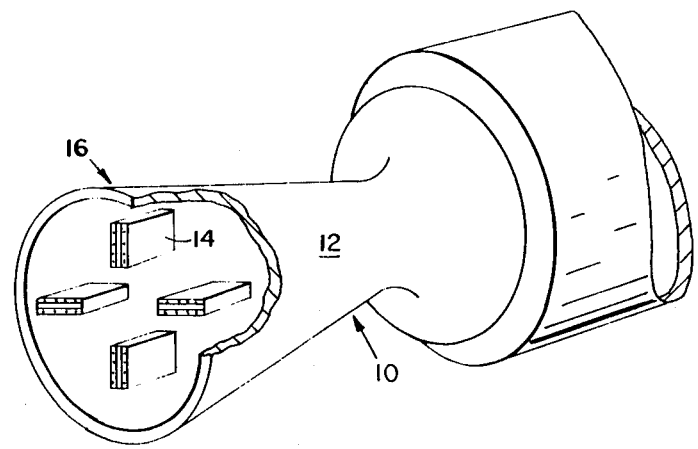
FIG. 1 is a pictorial view of a rocket having the jet vanes of the present invention secured in the diverging section of the nozzle.

As seen in FIG. 1, a rocket 10 includes a nozzle 12 provided with four jet vanes 14 rigidly secured in the diverging section 16 thereof. Vanes 14 include a plurality of openings 18 (holes or slots) down sides 17 and 19 through which fluid is directed to control circulation and provide a side force which deflects rocket exhaust gases flowing out of nozzle 12. Surfaces 17 and 19 are in angular relation to the longitudinal axis of the vane.

Figure 2:
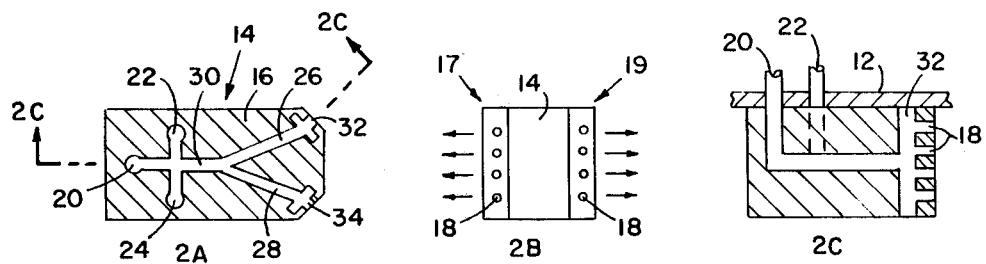

FIG. 2 illustrates an embodiment of the invention wherein jet vane 14 is provided with a fluid amplifier 16 integral therewith. The jet vane includes an inlet 20 connected to a source of gas, a pair of control ports 22 and 24 also connected to a source of gas, a pair of exit passages 26 and 28 communicating with a chamber 30. Chamber 30 communicates also with control ports 22 and 24 and inlet 20. Passages 26 and 28 connects to a pair of manifolds 32 and 34, respectively. The manifolds extend to substantially the height of jet vane 14 and down each side 17 and 19 of the jet vane. The source of gas for the control ports and the supply flow extends through the wall of nozzle 12 as seen in FIG. 2c. FIG. 2b illustrates the openings 18 through which gas is directed for controlling circulation to deflect exhaust gases from nozzle 12. The fluid amplifier may be either the PDM type or proportional type. Flow through the openings on side 17 or 19 of the jet vane is controlled by actuation of control ports 22 and 24 as is well known in the fluid amplifier art.

Figure 3:
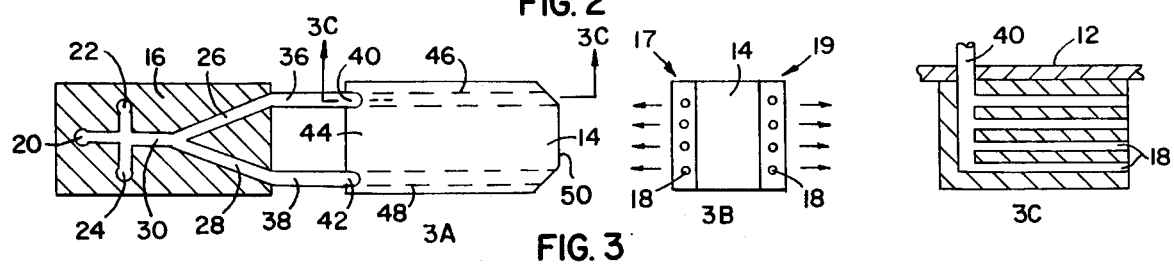

In the embodiment shown in FIG. 3, wherein like numerals refer to like parts, a fluid amplifier similar to fluid amplifier 16 is utilized. This fluid amplifier will be designated by the numeral 16. In this embodiment the fluid amplifier is external to the nozzle 12. Exit passages 26 and 28 are connected to a pair of conduits 36 and 38, respectively which connect to a pair of manifolds 40 and 42 in one end 44 of jet vane 14. The manifolds are connected to a plurality of passages 46 and 48 which extend through the jet vane to exit at the opposite end 50 thereof. Operation of the device of this embodiment is similar to that disclosed in the embodiment of FIG. 2. Gas flow is controlled by selective actuation of control ports 22 and 24 to deflect the main gas flow through the openings on sides 17 and 19 as desired. This flow can be made to be directed upstream, laterally or downstream, at various angles, by appropriate design of passage 18.

Figure 4:
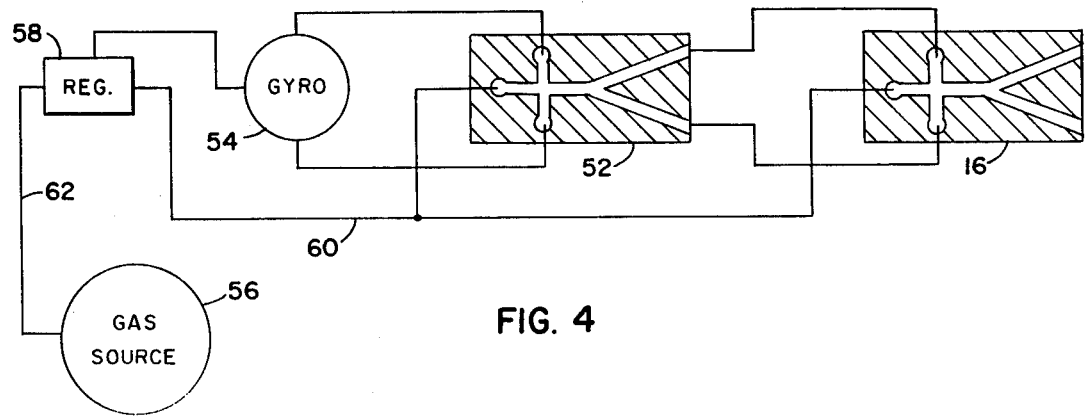
FIG. 4 is a diagrammatic view of the control system of the present invention.

As seen in FIG. 4 each fluid amplifier, whether external to the vane or integral therewith, has its control ports connected to a fluidic pulse duration modulation or proportional unit 52 which is controlled by the analog output of a fluidic gyro 54. Gas source 56, which may be nitrogen gas or the like, is directed to inlet 20 through a regulator 58 in conduit 60 and to the fluidic gyro through conduit 62.

I claim:

1. A thrust vector control system for a rocket having a converging-diverging nozzle for expulsion of propulsive gases therefrom comprising:
  a. a source of gas;
  b. four jet vanes fixedly secured in said diverging portion of said portion of said nozzle in equally spaced relation, each said jet vane having a pair of spaced surfaces disposed in angular relation to the longitudinal axis of said vane, and, a row of openings extending in spaced relation along said spaced surfaces, said jet vanes having passages therethrough in communication with said source of gas and said openings to selectively direct gas through the desired row of said openings;
  c. fluid amplifier means for directing said gas through said jet vanes for controlled flow of said gas about said jet vanes whereby a side force is developed to simulate an angle of attack of said jet vanes without physical movement thereof.

2. A thrust vector control system as set forth in claim 1 wherein said fluid amplifier is integral with said jet vanes, said fluid amplifier having an inlet, a chamber communicating with said inlet and exit passages communicating with said chamber, control ports communicating with said chamber for controlling gas flow through said fluid amplifier, manifold means disposed adjacent said pair of surfaces in communication with said passage for directing gas out of said openings in said surfaces.

3. A thrust vector control system as set forth in claim 1 wherein said fluid amplifier is disposed externally of said nozzle, said jet vanes having two rows of passages therethrough in communication with said openings in said spaced surfaces and terminating in a pair of manifolds adjacent the opposite end surface of said jet vanes, said fluid amplifier having an inlet, a chamber communicating with said inlet and exit passages communicating with said chamber for controlling gas flow through said fluid amplifier, said exit passages of said fluid amplifier disposed in communication with said manifolds.

* * * * *